Dec. 11, 1934. C. D. STARKS 1,984,239
CRAB NET
Filed May 22, 1934 2 Sheets-Sheet 1
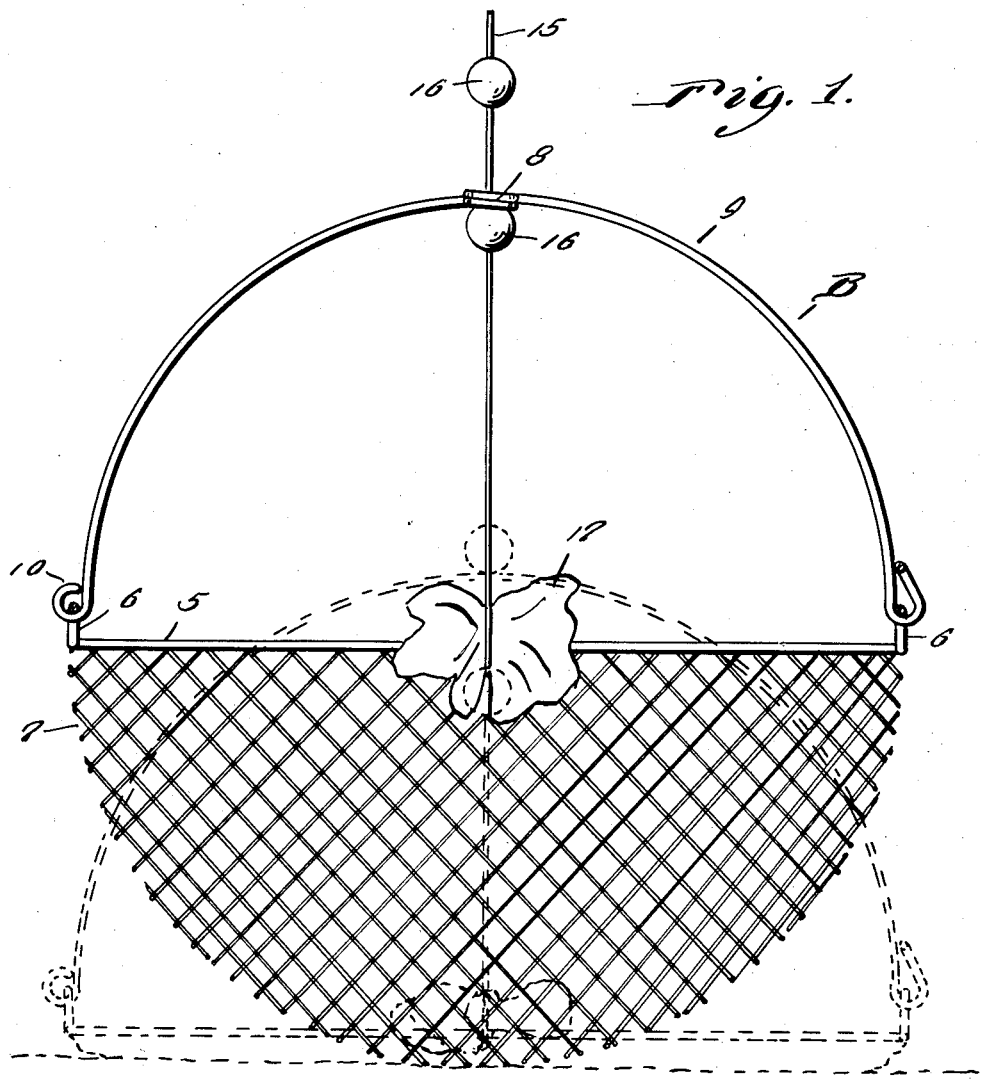
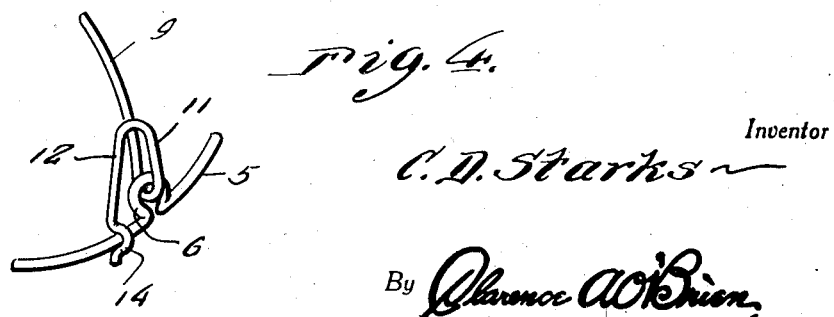
Inventor
C. D. Starks
By Clarence A. O'Brien
Attorney Dec. 11, 1934. C. D. STARKS 1,984,239
CRAB NET
Filed May 22, 1934 2 Sheets-Sheet 2

Inventor
C. D. Starks

By Clarence A. O'Brien
Attorney

Patented Dec. 11, 1934

1,984,239

UNITED STATES PATENT OFFICE 1,984,239

CRAB NET

Charles D. Starks, Far Rockaway, N. Y.

Application May 22, 1934, Serial No. 726,996

2 Claims. (Cl. 43—7)

The present invention relates to a crab net and has for its prime object to provide means whereby a net may be set with bait and when the crab engages the bait the same will be readily made known to the user of the device.

A further important object of the invention resides in the provision of a crabbing device of this nature which is exceedingly simple in its construction, inexpensive to manufacture, thoroughly efficient and reliable in use, and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 1 is a side elevation of a contraption embodying the features of my invention.

Figure 4 is a perspective view showing one end of the bail in association with a portion of the net frame.

Figure 2:
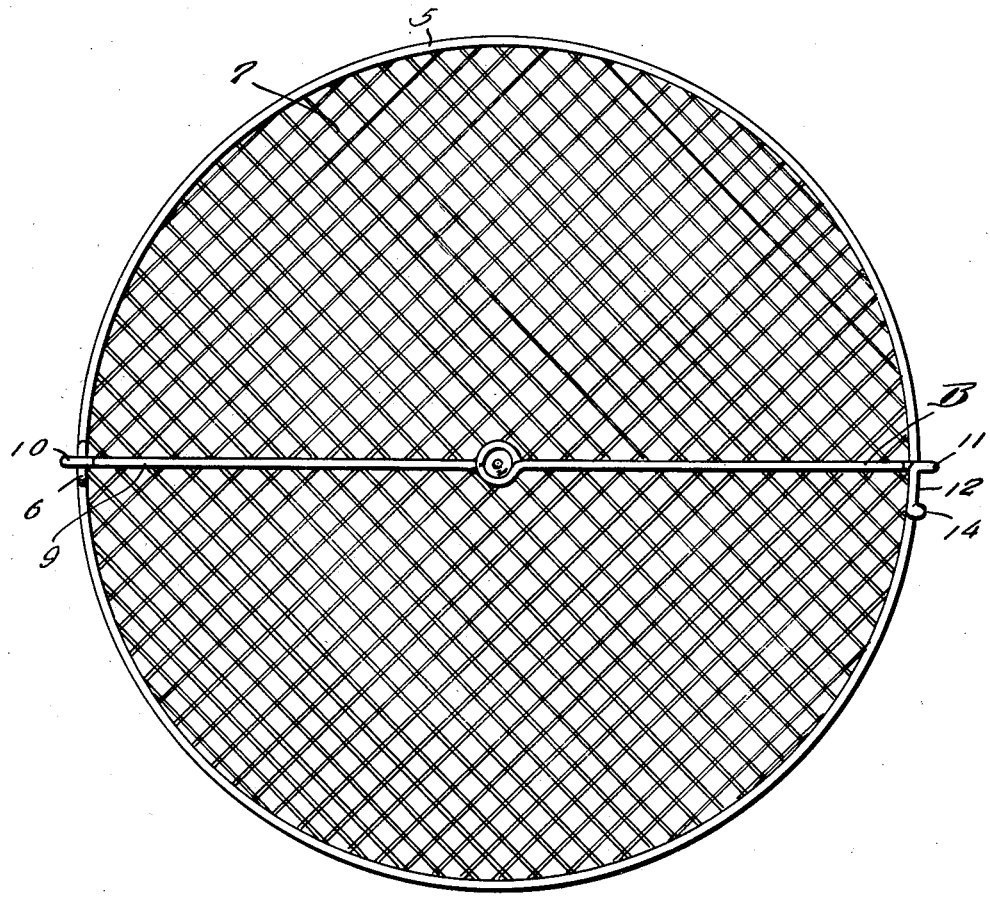
Figure 2 is a top plan view thereof.
Figure 3:
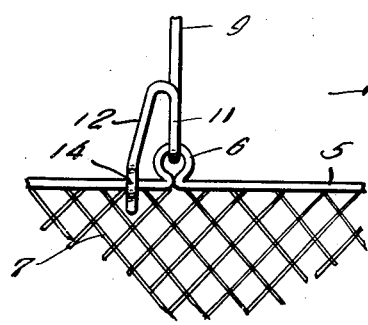
Figure 3 is a detail side elevation showing one end of the bail and one side of the net frame.

Referring to the drawings in detail it will be seen that the numeral 5 denotes the net frame which is in the form of an annular rod having opposed portions merging into upwardly disposed eyes 6. Numeral 7 denotes a crab net which in extended position is of a semi-spheroidal construction as illustrated to advantage in Figure 1. The letter B denotes generally a bail of a general semi-circular construction including a rod 9 bent intermediate its ends into convolutes forming an eye 8. One end terminates in a closed hook eye 10 engaged with one eye 6. The other end terminates in an oblong loop 11 engaged with the other eye 6 and merges into a depending downwardly diverging arm 12 terminating in an arcuate terminal 14 which engages with a portion of the frame 5 for normally holding the bail B in its upright position. Numeral 15 denotes a line extending through the eye 8 and having a pair of spaced ball stops 16, 16 frictionally fixed thereto, one below and one above the eye. Bait 17 is engaged with the lower end of the line 15. In dotted lines in Figure 1 I have shown the starting position with the net collapsed. When a crab engages the bait 17 the pull on the line will be indicated to the operator that the line should be pulled up to the full line position shown in Figure 1 at which time the crab is trapped in the net.

It is thought that the construction, operation, utility and advantages of this invention will now be clearly understood by those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device of the class described comprising a frame, a net depending from the frame, a bail secured to the frame and having an eye, a line extending through the frame, said line being provided with stops one on each side of the eye, said line adapted to have bait secured to the lower end thereof, said frame being provided at opposite sides with upwardly extending eyes, said bail being provided at one end with an eye engaging one of the first mentioned eyes and at the other end with an oblong loop engaging the other of said first mentioned eyes and the loop merging into a downwardly diverging arm terminating in an arcuate portion engaging the frame to hold the bail in upright position.

2. A device of the class described comprising a frame, a net depending from the frame, said frame being provided at opposite sides with upwardly extending eyes, a bail being provided at one end with an eye engaging one of the first mentioned eyes and at the other end with an oblong loop engaging the other of said first mentioned eyes and the loop merging into a downwardly diverging arm terminating in an arcuate portion engaging the frame to hold the bail in upright position.

CHARLES D. STARKS.